United States Patent
Berntorp et al.

(10) Patent No.: US 10,012,984 B2
(45) Date of Patent: Jul. 3, 2018

(54) SYSTEM AND METHOD FOR CONTROLLING AUTONOMOUS VEHICLES

(71) Applicant: Mitsubishi Electric Research Laboratories, Inc., Cambridge, MA (US)

(72) Inventors: Karl Berntorp, Watertown, MA (US); Oktay Arslan, Decatur, GA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 252 days.

(21) Appl. No.: 14/968,848

(22) Filed: Dec. 14, 2015

(65) Prior Publication Data

US 2017/0168485 A1 Jun. 15, 2017

(51) Int. Cl.
| | |
|---|---|
| G05D 1/00 | (2006.01) |
| G01C 21/26 | (2006.01) |
| G01C 21/34 | (2006.01) |
| G05D 1/02 | (2006.01) |
| G01C 21/20 | (2006.01) |

(52) U.S. Cl.
CPC ........... *G05D 1/0088* (2013.01); *G01C 21/20* (2013.01); *G01C 21/26* (2013.01); *G01C 21/3453* (2013.01); *G05D 1/0214* (2013.01); *G05D 1/0274* (2013.01)

(58) Field of Classification Search
CPC .. G05D 1/0088; G05D 1/0214; G05D 1/0274; G01C 21/26; G01C 21/3453; G01C 21/20
See application file for complete search history.

(56) References Cited

U.S. PATENT DOCUMENTS

| | | | |
|---|---|---|---|
| 7,734,387 B1 | 6/2010 | Young et al. | |
| 8,038,062 B2 | 11/2011 | Kenefic | |
| 8,666,548 B2 | 3/2014 | Lim | |
| 8,825,207 B2 | 9/2014 | Kim et al. | |

(Continued)

FOREIGN PATENT DOCUMENTS

EP 1733287 2/2005

OTHER PUBLICATIONS

Lan Xiadong et al. "Continuous curvature path planning for semi autonomous vehicle maneuvers using RRT>" 2015 European Control Conference, Jul. 15-17, 2015. Linz, Austria. EUCA Jul. 15, 2015. pp. 2360-2365.

*Primary Examiner* — Richard M Camby
(74) *Attorney, Agent, or Firm* — Gene Vinokur; James McAleenan; Hironori Tsukamoto

(57) ABSTRACT

A method determines iteratively a motion of the vehicle from an initial location and a target location. An iteration of the method determines a location between the initial location and the target location that satisfies spatial constraints on locations of the vehicle and determines state transitions of the vehicle moved to the location from a set of neighboring locations determined during previous iterations. The method selects a neighboring location resulting in an optimal state transition of the vehicle and updates a graph of state transitions of the vehicle determined during previous iterations with the optimal state transition. The motion of the vehicle is determined a sequence of state transitions connecting the initial location with the target location and the vehicle is controlled according to the determined motion.

20 Claims, 19 Drawing Sheets

(56) References Cited

U.S. PATENT DOCUMENTS

| | | | |
|---|---|---|---|
| 9,120,485 B1* | 9/2015 | Dolgov | B60W 30/10 |
| 9,645,577 B1* | 5/2017 | Frazzoli | G05D 1/0214 |
| 2005/0216181 A1 | 9/2005 | Estkowski et al. | |
| 2008/0303696 A1* | 12/2008 | Aso | G08G 1/161 |
| | | | 340/935 |
| 2014/0207325 A1 | 7/2014 | Mudalige et al. | |

* cited by examiner

SYSTEM AND METHOD FOR CONTROLLING AUTONOMOUS VEHICLES

FIELD OF THE INVENTION

The present invention relates generally to controlling vehicles, and more particularly to controlling a vehicle, such as an autonomous or a semi-autonomous vehicle.

BACKGROUND OF THE INVENTION

Some of the control systems used in autonomous vehicles aims to move the vehicles through the surroundings, by predicting safe motions for the vehicle avoiding obstacles. The surroundings, such as road edges, pedestrians, and other vehicles, are sensed by the sensors of the vehicle and/or at least partially known by a priori given information. However, the sensor information is noisy and uncertain and the control of the vehicle should account for such an uncertainty. Moreover, it is also can be important to optimize the operation of the vehicle associated with the predicted motion.

For example, if an autonomous vehicle travels along a road segment, the control system of the autonomous vehicle can generate a motion that minimizes one or combinations of deviations from the middle of the lane and speed variations to provide a smooth ride for the passenger and to provide a smooth traffic flow. Another example is autonomous parking, where the number of steering and forward/reverse changes could be minimized for increased efficiency and comfort of the passenger.

One objective of the motion planning is to generate an optimal path and corresponding trajectory from initial vehicle state to a target state. The states include dynamics of the vehicle, such as locations, velocities and headings of the vehicles. However, many types of vehicles, such as cars, trucks, and other nonholonomic mobile robots, are underactuated systems having nonlinear, complex, and potentially unstable dynamics. The underactuated system means that the vehicles have restrictions on their movements. Such a restriction can result from a fewer number of actuators than degrees of freedom in the system. For example, the car cannot move sideways. In addition, instability for these types of vehicles means that a small change in control input can lead to significantly different behavior (output) in the system response, where system response could include entities such as positions, velocities, and accelerations.

As a consequence, predicting safe motions that the vehicle can move along and providing reliable performance become important, but tedious tasks. To that end, a number of systems determine first the optimal path for the vehicle, and then determine the motion of the vehicle moving along the optimal path.

For example, one method uses a closed loop rapidly-exploring random tree (CL-RRT), which, instead of sampling in the control space, randomly samples the reference space, i.e., the space of locations, to grow a tree of possible locations. The states of the vehicles at newly sampled locations are determined from the closest location in the tree. However, this method does not determine the optimal motion of the vehicle.

SUMMARY OF THE INVENTION

Some embodiments of an invention are based on recognition that an optimal path of a vehicle from the initial location to a target location does not necessarily correspond to the optimal motion of the vehicle. The underactuated nature of the vehicle can lead to more optimal state transitions between states of the vehicle that are different from the transitions along the shortest possible path leading to the target location. The states of the vehicle include dynamics of the vehicle, such as locations, velocities and headings of the vehicles. Therefore, more optimal state transitions lead to more optimal motion of the vehicle.

Some embodiments of the invention are based on a realization that a state transition to a state determined from different possible states increases the likelihood of selecting the optimal state transition. To that end, the state transitions of the vehicle moved to a location are determined from a set of neighboring locations having the states determined during previous iterations.

For example, the transition to a location from a first location can be more optimal than a transition to the location from a second location, even if the second location is closer to the location that the first location. For example, the heading of the vehicle at the second location can result in a complicated path that reaches the location. Because of the complexity of the relationship between optimality of the transitions between different states, testing the multiple neighboring location allows to optimize the motion from the initial location to a target location without a significant increase of the computational resources.

Accordingly, one embodiment discloses a method for controlling a vehicle including determining iteratively a motion of the vehicle from an initial location and a target location, wherein the motion is defined by state transitions connecting states of the vehicle, each state includes a location, a velocity and a heading of the vehicle, wherein the motion is determined iteratively until a termination condition is met.

An iteration of the method includes determining a location between the initial location and the target location, wherein the location satisfies spatial constraints on locations of the vehicle; determining state transitions of the vehicle moved to the location from a set of neighboring locations determined during previous iterations, wherein each state transition satisfies constraints on a motion of the vehicle; selecting a neighboring location resulting in an optimal state transition of the vehicle from the state at the neighboring location to the state at the location; and updating a graph of state transitions of the vehicle determined during previous iterations with the optimal state transition.

The method also includes determining the motion of the vehicle as a sequence of state transitions connecting the initial location with the target location; and controlling the vehicle according to the determined motion. Steps of the method are performed by a processor of the vehicle.

Another embodiment discloses a control system of a vehicle including a navigation system to determine an initial location and a target location of the vehicle; a vehicle controller to control a motion of the vehicle; and a motion-planning system including a processor and a memory storing the initial location and the target location, wherein the motion-planning system iteratively determines state transitions moving the vehicle to a location from a plurality of neighboring locations having the states determined during previous iterations to produce a graph of state transitions of the vehicle, wherein the motion-planning system determines the motion of the vehicle as a sequence of state transitions connecting the initial location with the target location, and submits the motion to the vehicle controller.

DETAILED DESCRIPTION OF THE PREFERRED EMBODIMENTS

Figure 1A:
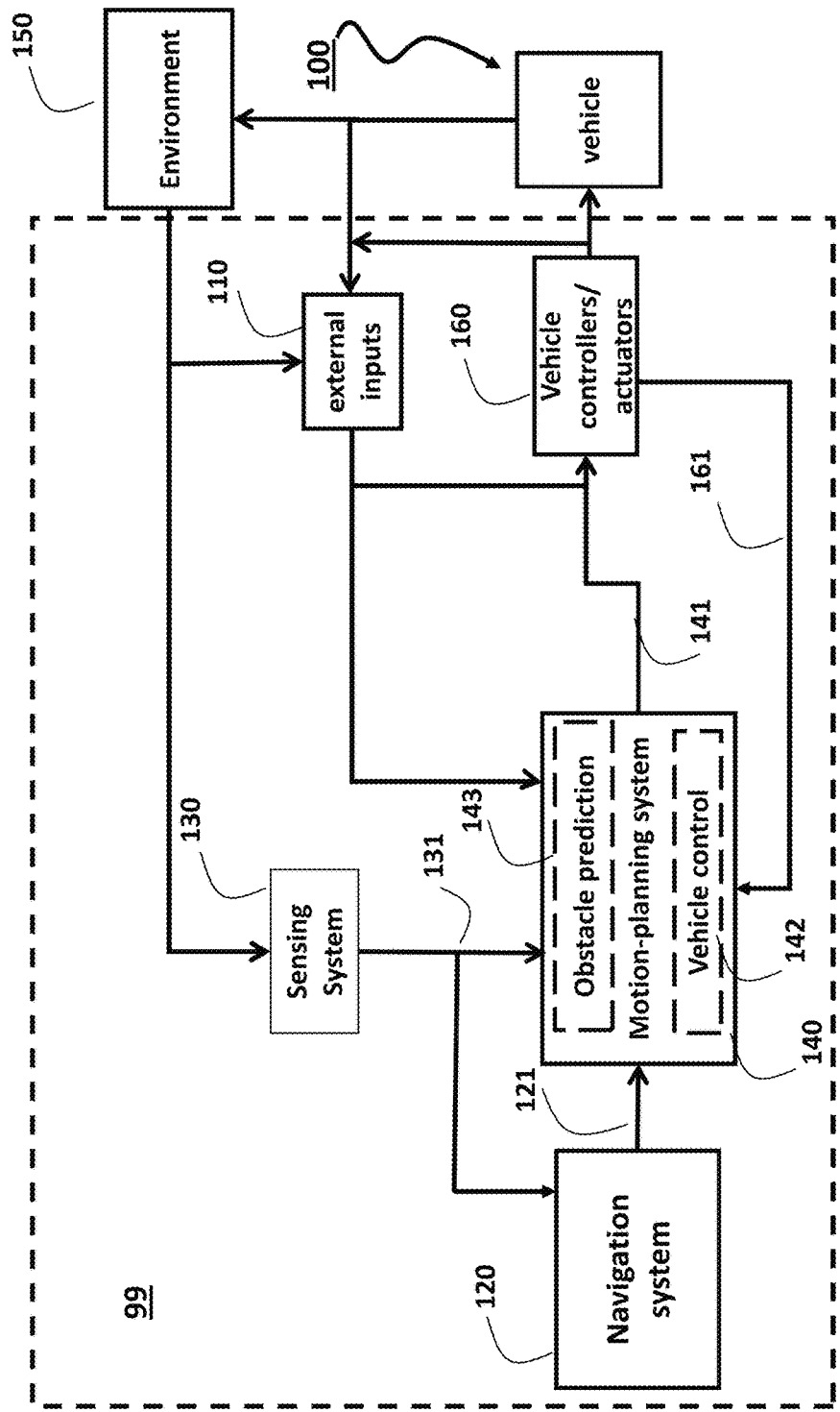
FIG. 1A is a block diagram of a control system for controlling a vehicle according to some embodiments of the intervention.

FIG. 1 shows a block diagram of a control system 99 for controlling a vehicle 100 according to some embodiments of the intervention. The vehicle can be any type of moving vehicle equipped with an autonomous system. The vehicle can also receive external inputs 110 overriding the commands of the control system 99. In such a case the vehicle is a semi-autonomous vehicle. As one example, the vehicle 100 can be a four-wheel passenger car. Another example of a possible vehicle is a differential-drive mobile robot, and/or an unmanned aerial vehicle.

The control system 99 includes a navigation system 120 for determining an initial location and a target location of the vehicle. For example, the navigation system 120 can include GPS and/or an inertial measurement unit (IMU). For example, the IMU can comprise 3-axis accelerometer(s), 3-axis gyroscope(s), and/or magnetometer(s). The IMU can provide velocity, orientation, and/or other position related information to other components of the control system 99.

For example, the initial location can be the current location as determined by the GPS. The target location can be determined in response to information 131 from the sensing system 130 including at least one sensor for detecting an obstacle on the predicted path of the vehicle. For example, the target location can be a location avoiding a collision with the obstacle.

The target location can also be determined in response to a change, e.g., a sudden change, of the state of the vehicle. Such a change can come from a driver of the vehicle and/or from another external command 110. The navigation system can also output several possible target states of the vehicle. For example, if the vehicle is driving on a two-lane road, there could be one target state in each lane. The navigation system outputs the initial and the target locations 121 of the vehicle as a pair of coordinates or as a desired motion of the vehicle.

The control system 99 also includes a motion-planning system 140 for computing a future motion of the vehicle. In some embodiments of the invention, the motion-planning system iteratively determines states of the vehicle moved to a current location from a set of neighboring locations having the states determined during previous iterations.

In one embodiment, the motion-planning system determines the motion of the vehicle by optimizing a cost function. For example, the cost function can penalize the deviation of at least some parameters of the state of the vehicle, such as acceleration, velocity, lateral displacement. In another embodiment, the motion is computed by optimizing a cost function determined from the desired driver motion.

In addition to the initial and the target locations, the motion-planning system 140 receives information 131 about the surroundings 150, such as obstacles, drivable, nondrivable, or illegal areas, for the vehicle. The information 131 can be received from the sensors 130. The information about the environment can be represented as a map. The motion-planning system 140 can also receive information 161 about the vehicle motion from the vehicle-control units 160. The information can include a state of the vehicle, such as position, heading, velocity, and is received either from hardware or software, connected directly or remotely to the machine.

The motion-planning system 140 determines the motion 141 for the vehicle that reaches the target state and avoids collision and nondrivable areas. The motion at least includes a path, velocity, and orientation/heading, but can also include further entities, such as rotational velocities, accelerations, and steering, brake, and engine torques.

In one embodiment of the invention, the motion-planning system includes predictions 143 of motions of obstacles received by the motion planner. In response to detecting an obstacle on the future best predicted motion of the vehicle, some embodiments of the invention compute a modified future motion of the vehicle. An obstacle can be another vehicle or a pedestrian, or a virtual obstacle representing illegal driving behavior, such as the line delimiting the allowed driving lane, a stop line, a yield sign, or from inputs from a driver or passenger.

For example, the computed motions are searched for collision with the obstacle, and one embodiment discards those that are predicted to collide with the obstacle. The modified future motion is determined starting from the remaining stored set of possible motions, computed from previous iterations. Some of the embodiments of the invention are based on that the sensor information 131 obtained from the sensing system 130 can be uncertain and with errors, and that predictions of obstacle motion is uncertain. In such a case, when corrected information is received from the sensor system 130, the motion computed by the motion-planning system 140 is modified as when detecting an obstacle on the path.

The motion 141 is used as an input to the vehicle controllers 160 to compute vehicle commands, such as steering, brake, and throttle. Those commands are submitted to the actuators of the vehicle to move the vehicle according to the predicted motion 141. The motion-planning system can include models 142 of the vehicle controllers 160 for computing the motion 141. Therefore, the motion computed by the motion-planning system 140 can accurately be executed by the vehicle-control system 160. For example, the vehicle control system 160 includes a steering controller, a brake controller and a throttle controller, and the motion-planning system includes model emulating the operations of those controllers.

Figure 1B:
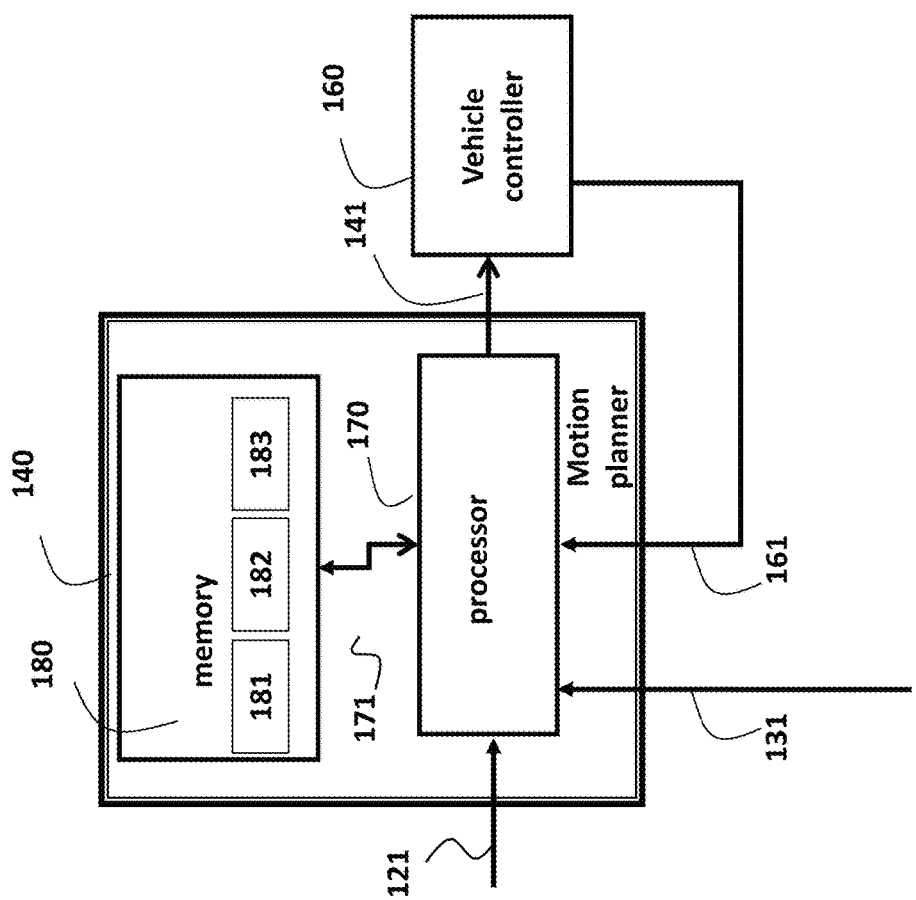
FIG. 1B is a diagram of a general structure of a motion-planning system according to one embodiment of the invention.

FIG. 1B shows a general structure of the motion-planning system 140 according to one embodiment of the invention. The motion-planning system 140 includes at least one processor 170 for executing modules of the motion-planning system 140. The processor 170 is connected to a memory 180 that stores the map 181 of the environment and the vehicle information 182. The memory 180 also stores 183 the future motions computed up to the current time and the internal information of the motion planner, including, but not limited to, cost function, values of each computed state, already visited but rejected states, the motion leading up to each state, information about deviations from the desired location of the vehicle, and future predicted motions of obstacles. The memory 180 can also store a model of the vehicle controllers. In some embodiments, the information on the vehicle and the environment are updated 171 based on information received from the vehicle 161 and the sensing 131.

Some embodiments of an invention are based on recognition that an optimal path of a vehicle from the initial location to a target location does not necessarily correspond to the optimal motion of the vehicle. That is, the underactuated nature of the vehicle can lead to more optimal transitions between states of the vehicle that are different from the transitions along the shortest possible path from the initial location to the target location. The states of the vehicle include dynamics of the vehicle, such as locations, velocities and headings of the vehicles. Therefore, more optimal transitions lead to more optimal motion of the vehicle.

Some embodiments of the invention are based on a realization that transition to a current state determined from different possible states increases the likelihood of selecting the transition leading to an optimal motion. To that end, the states of the vehicle moved to a current location are determined iteratively from a set of neighboring locations having the states determined during previous iterations.

For example, the transition to a current location from a first location can be more optimal than a transition to the current location from a second location, even if the second location is closer to the current location than the first location. For example, the heading of the vehicle at the second location can result in a complicated path that reaches the current location. Because of the complexity of the relationship between optimality of the transitions between different states, testing the multiple neighboring location allows to optimize the motion from the initial location to a target location without a significant increase of the computational resources.

For example, some embodiments determine a reference graph of the possible locations, and use this reference graph to determine multiple motions to a current location from different locations on the reference graph. Building the reference graph of possible locations allows limiting a number of neighboring locations to be tested. In addition, some embodiments build a motion graph of the motions of the vehicle between different locations, such as locations of the reference graph.

Figure 2A:
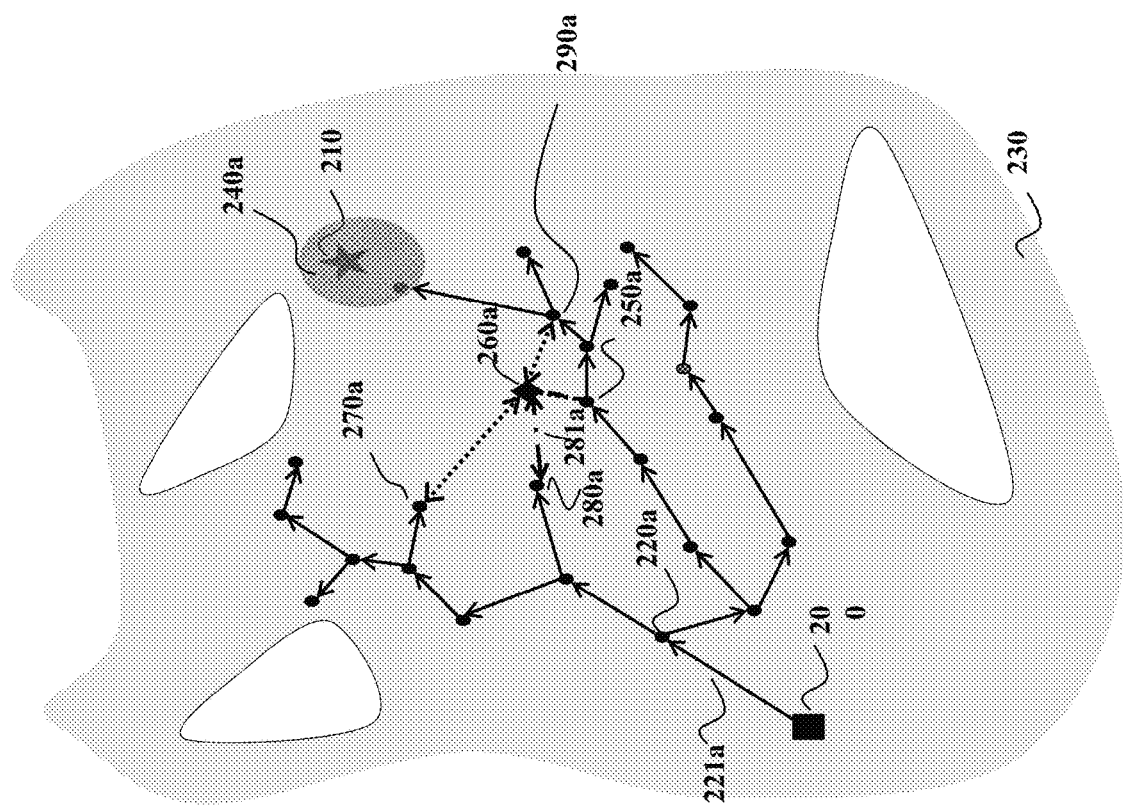
FIG. 2A is a schematic of a graph of possible locations determined according to some embodiments of the invention.

FIG. 2A shows a schematic of a graph of possible locations determined according to some embodiments of the invention. For example, one embodiment generates points of possible locations of the vehicle as nodes in the graph and connects the points with edges forming the set of possible paths for the vehicle. The current graph in the drivable space 230 is shown with root node 200 representing the current position of the vehicle and includes nodes 220a connected with edges 221a. The graph can include a target position 210 and target region of the output 240a. The nodes of the graph in FIG. 2A are locations of the vehicle. In one embodiment, the nodes of the graph in FIG. 2A include a subset of the states of the vehicle, e.g., an orientation of the vehicle.

Figure 2B:
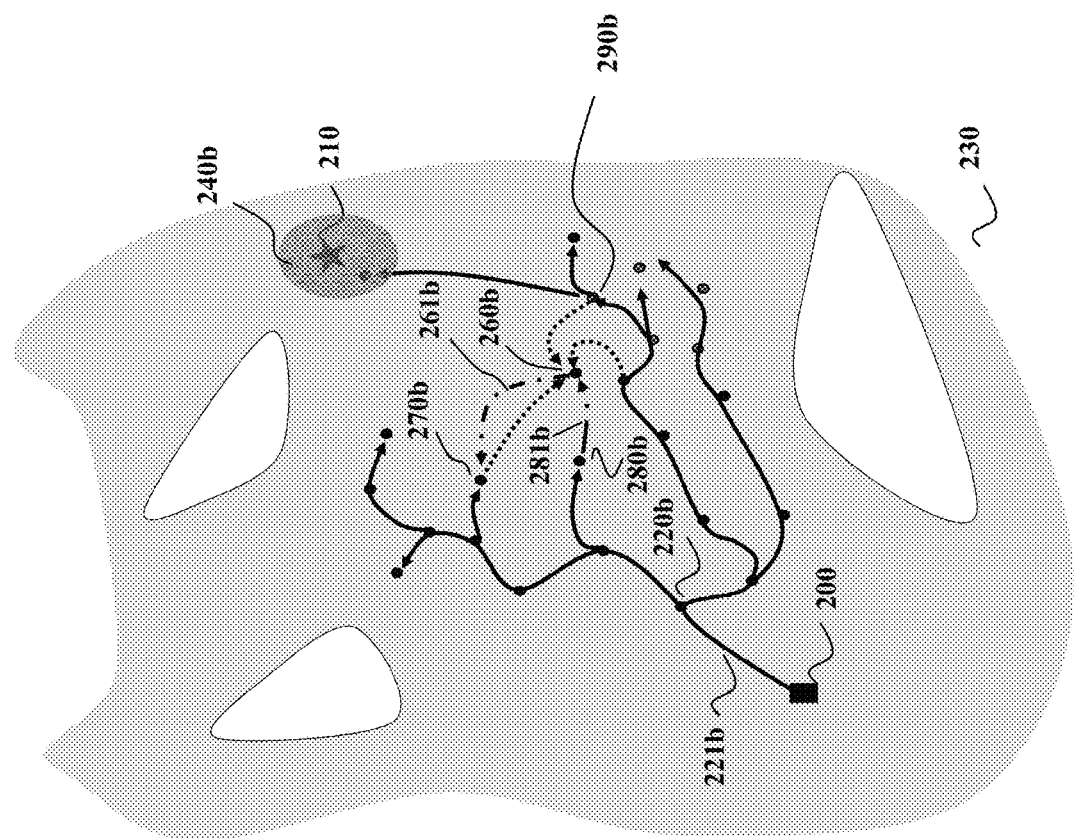
FIG. 2B is a schematic of a graph of state transitions defining the motion of the vehicle according to some embodiments of the invention.

FIG. 2B shows a schematic of a graph of state transitions defining the motion of the vehicle according to some embodiments of the invention. FIG. 2B shows the states as nodes and the state transitions as edges in state space corresponding to the nodes and edges in FIG. 2A. For example, edge 221b is the motion generated by moving from root node 200 to point 220b, corresponding to point 220a on the graph in the output space. The nodes 220a and 220b can represent the same or different locations. The deviation of the locations for the nodes 220a and 220b can result in specificity of the motion of the vehicle. Because the vehicle is underactuated the location of the node 220a can be difficult to reach. Instead, when trying to move to point 220a, the vehicle reaches point 220b, which is close to 220a, but not exactly the same. In some embodiments of the invention, the edges 221b are created by tracking a reference trajectory between 200 and 220a, in other embodiments of the invention, the edges 221b are created by regulating the motion of the vehicle to move in proximity to the location of the node 220a.

In some embodiments, the connections in state space are made by using sampled locations in the output space as references to a control system of the vehicle in the motion-planning system. The control system then moves close to the sampled points while obeying constraints on the allowed motion of the vehicle. Different control systems can be used in the motion-planning system. For example, but not limited to, by using model-predictive control (MPC), constraints on the motion of the vehicle, arising from the construction of the vehicle, upper and lower limits on allowed velocities and rotation rates, and accelerations, can be accounted for in the construction of the motion. Such control helps in computing a motion that can be executed with high precision by the vehicle-control system 140.

In one embodiment of the invention, a new point 260*a* in the drivable output space is randomly selected. The node 260*a* is connected to the graph by making connections to other nodes in the neighborhood of 260*a* such that the motion connecting nodes 200 and 260*b* has lower cost, according to a cost function given by some embodiments of the invention, than any other connection. For example, the optimal transition to 260*b* is to connect with 280*b* with the edge (state transition) 281*b*. This corresponds to node 280*a* and edge 281*a* in FIG. 2A, which can differ from the optimal node in FIG. 2A. Next, edges in the graphs are updated. As an example, for nodes 270*a* and 270*b*, the parent node leading to edges 270*a* is 260*a*, since 261*b* yields a lowest cost to reach node 270*b* from the root node 200.

Figure 2C:
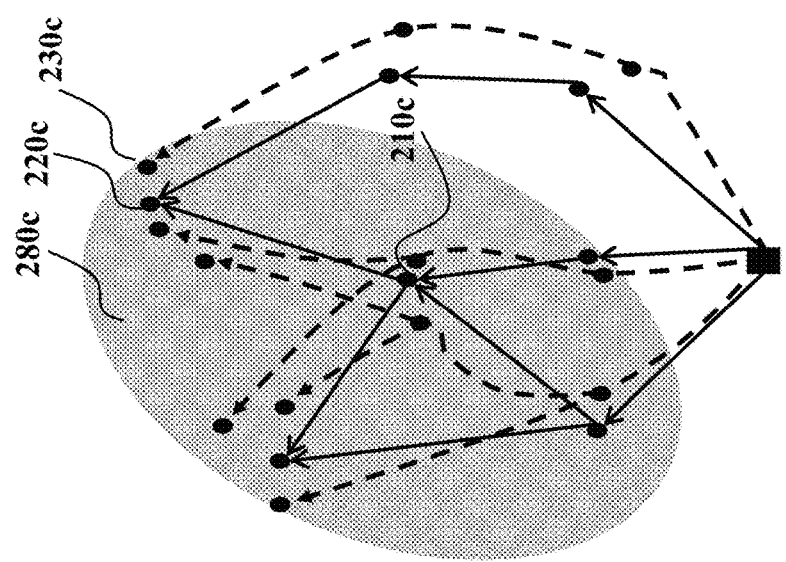
FIG. 2C is a neighborhood for determining state transitions between states according to one embodiment of the invention.

FIG. 2C shows the neighborhood in which the optimal state transitions between states are constructed according to one embodiment of the invention. Edges in solid black are paths in space of locations and dashed edges are state transitions in the state space. When a new node 210*c* in space of locations is added, several incoming and outgoing edges are included in a neighborhood 280*c* of the new node. For example, node 230*c* in state space is created by simulating the system to reach node 220*c* in output space. Point 230*c* is close, but not the same as 220*c* and does not have to be contained in the neighborhood of the node 210*c*.

Figure 3:
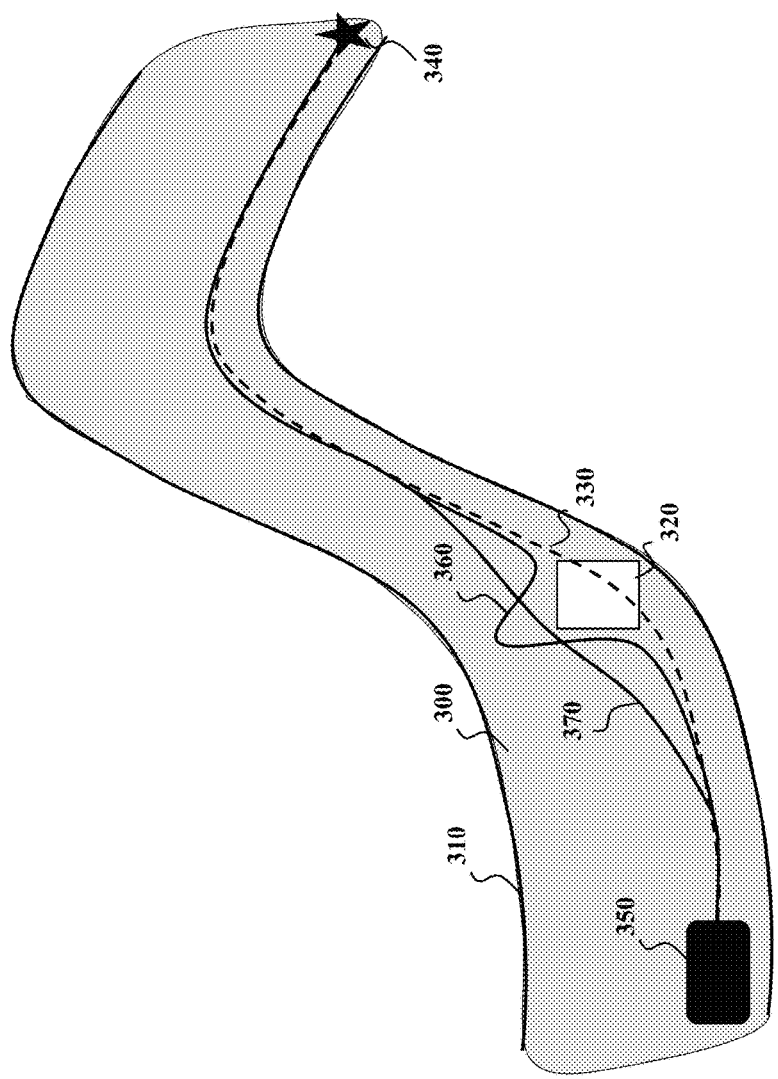
FIG. 3 is a schematic of different motions determined according to some principles employed by some embodiments of the invention.

FIG. 3 shows a schematic of different motions determined according to some principles employed by various embodiments of the invention. The drivable area 300 includes the road 310 except for the area 320 where an obstacle is present. The desired motion 330, which can be determined from the intents of a driver or a passenger of the vehicle, can be interpreted as the reference motion that reaches the target state 340 from the current state 350 of the vehicle, but goes through the nondrivable area of the obstruction 320. Thus, the motion planner generates the motion, such as motions 360 and 370, which avoid the obstacle 320 but starts and end at the same positions as the desired motion 330.

In some of the embodiments of the invention, the motion is computed by optimizing a cost function that combines deviations from a nominal motion and other measures of performance, for example, deviations from a nominal velocity, distance to surrounding obstacles, or the magnitude of steering input. To illustrate, the motion 360 stays close to the desired motion, whereas motion 370 signifies the importance of maintaining small steering inputs. In the motion-planning system, several different motions that lead to the target state 340 are computed, and the cost function determines which motion to select.

Figure 4A:
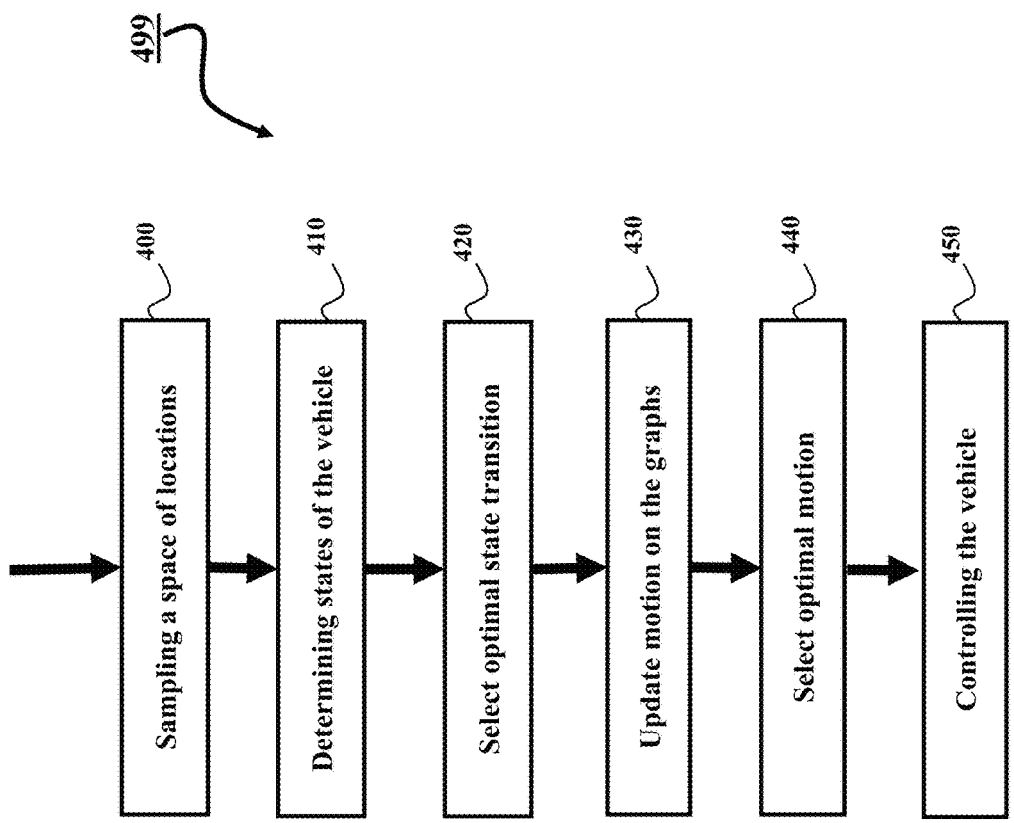
FIG. 4A is a flowchart of a method for controlling a vehicle according to some embodiments of the invention.

FIG. 4A shows a flowchart of a method 499 for controlling an autonomous vehicle according to some embodiments of the invention. The method determines iteratively a motion of the vehicle from an initial location and a target location, e.g., determined by the navigation system 120. The motion is defined by the state transitions connecting states of the vehicle, e.g., as shown in FIG. 2B. Each state includes a location, a velocity and a heading of the vehicle. Steps of the method are performed by a processor 170 of the motion-planning system 140 and/or of the vehicle. The motion is determined iteratively until a termination condition is met, e.g., for a time period or for a predetermined number of iterations. An iteration of the method of FIG. 4A includes the following steps.

The method determines 400 a location between the initial location and the target location, such that the location satisfies spatial constraints on locations of the vehicle. For example, the method determines the location at the node 260*a*.

Figure 4B:
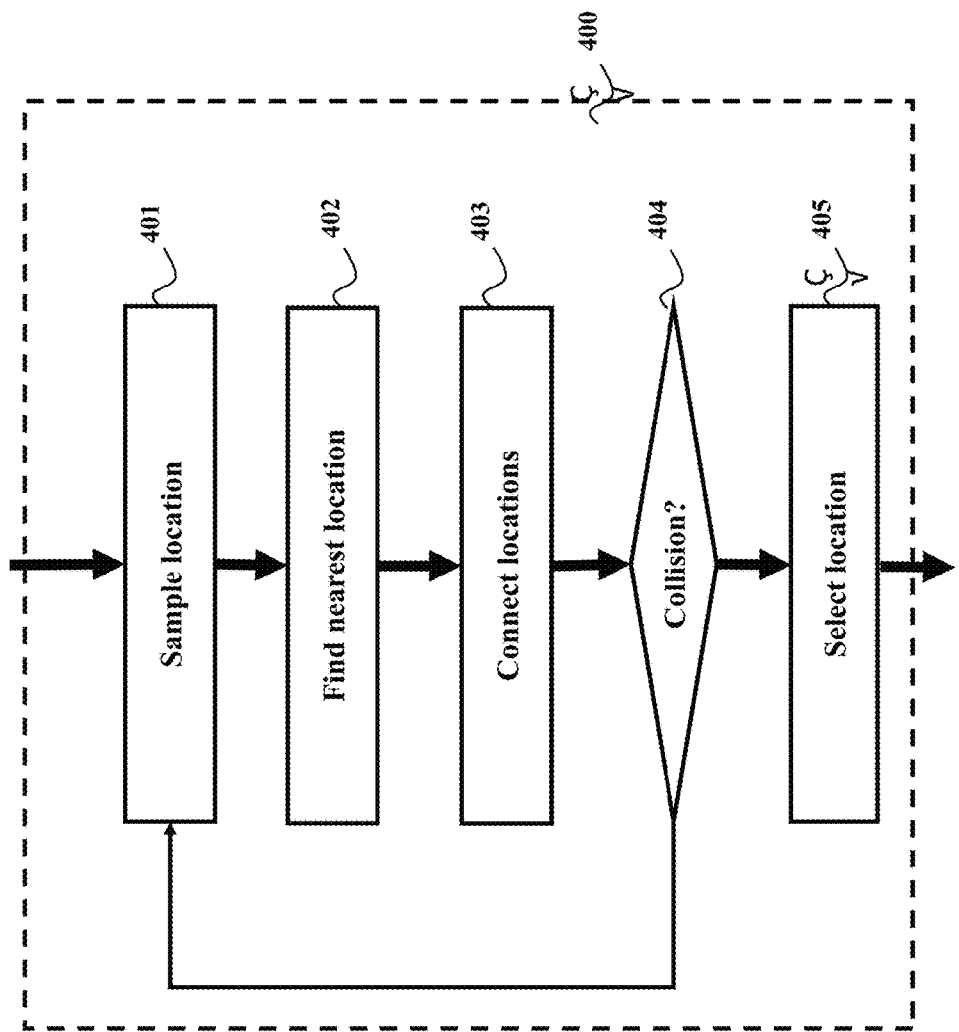
FIG. 4B is a flowchart of an exemplar implementation of the determining the location for the method of FIG. 4A according to one embodiment of the invention.

FIG. 4B shows a flowchart of an exemplar implementation of the determining the location 400 according to one embodiment of the invention. The determining 400 uses information about the environment and previously locations determined during previous iterations. Examples of the previous locations include locations of the nodes 250*a*, 270*a*, 280*a* of FIG. 2A.

The method performs the initial sampling 401 of the location and connects 403 the sampled location 401 to the closest location 402 to the sampled location. For example, the method samples the location at the node 260*a* and connects the node to the nodes 250*a*. A line segment between the closest location and the sampled location is checked for collision. If the line segment results in a collision with an obstacle in the environment, the method samples 401 the new location. Otherwise the initial sample is added to the reference graph of possible locations.

In some embodiments of the invention, only the sampled location is checked for collision, when the vehicle should reach the sampled location but tracking the line segment between the two locations is not important. A line segment can be a straight line in space, or have other shapes, as described below.

In one embodiment of the invention, the sampled location is replaced with different location if the sampled location is located to far from any of the previously sampled location. For example, one embodiment determines a length of the line segment and replaces the sampled location with an intermediate location on the line segment at a predetermined distance along the line segment from the previously sampled location, if the length is greater than the predetermined distance. An example of such a replacement is shown in relation with FIG. 5A.

Next, the method 499 determines 410 state transitions of the vehicle moved to the location from a set of neighboring locations determined during previous iterations, wherein each state transition satisfies constraints on a movement of the vehicle. In such a manner, multiple states can be determined for the location to optimize the motion of the vehicle through on in the proximity from the location. Examples of the state transitions are shown in FIG. 2B. For example, multiple state transitions are leading the state at the node 260*b* from different neighboring states such as 270*b* and 280*b*.

Figure 4C:
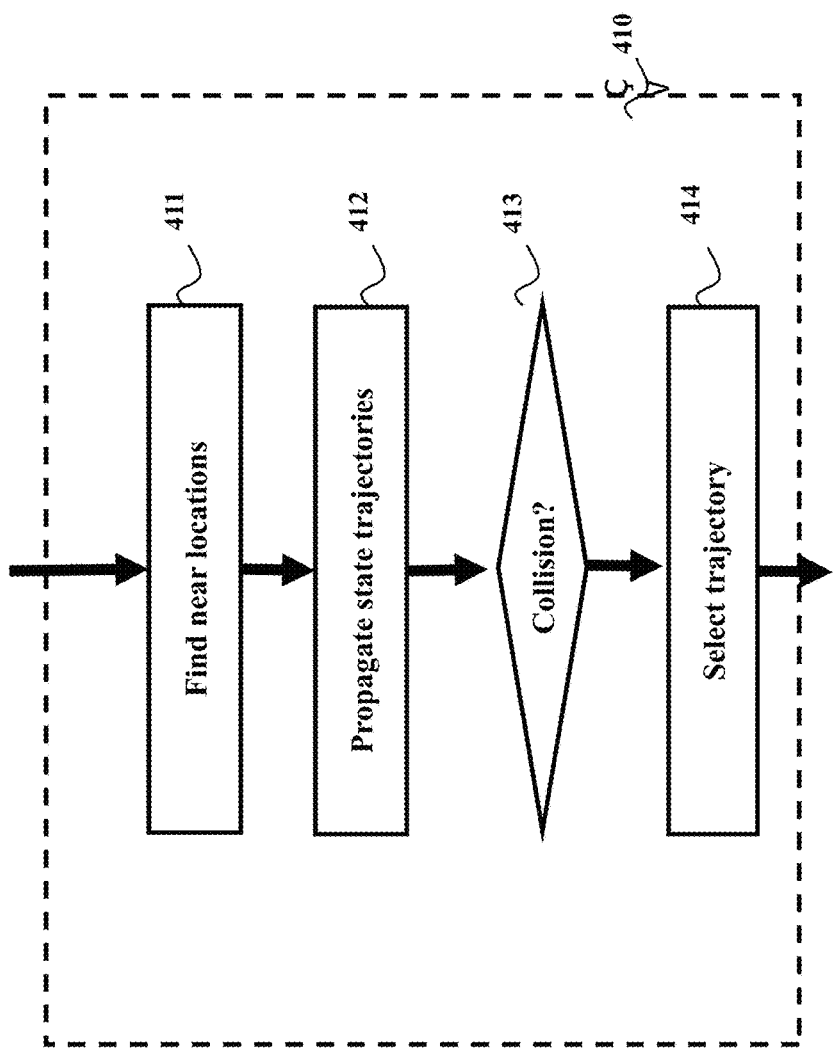
FIG. 4C is a flowchart of a method that determines the state transitions of the vehicle moved toward the location from a set of neighboring locations determined during previous iterations according to one embodiment of the invention.

FIG. 4C shows a flowchart of the method 410 that determines the state transitions of the vehicle moved toward the location from a set of neighboring locations 411 determined during previous iterations. Each movement to the sampled location results in a motion, which satisfies constraints on the allowed motion of the vehicle. When determining the motion 412 toward a sampled location, some embodiments of the invention use a model of the vehicle controller and motions from states of the vehicle determined during previous iterations. If the state trajectories are collision free 413, they are accepted 414. In this embodiment the constraints on the movement of the vehicle define that the state transitions are free from the collision. For example, the embodiment tests whether the state transition is free from the collision and removes the state transition from the set of the state transition, if the state transition results in a collision.

In one embodiment of the invention, the motion-planning system includes predictions of the movement of the obstacles, whereas a collision is checked both in space and time. For example, if an obstacle is at a position that gives collision at one time instant, at another time instant the same position may not lead to collision, depending on the movement of the obstacle and computed motion of the vehicle.

To that end, one embodiment determining a position of an obstacle between the initial location and the target location as a function of time, determines the state transition as a function of time, and tests whether the position of the obstacle and the state transition intersects in both the time and the space.

In various embodiments, the set of neighboring locations can include different number of locations. For example, one embodiment determining the distance for determining the neighboring locations as a function of a total number of previously sampled locations. This embodiment allows varying the number of neighboring locations based on the density of the sampled locations.

The method 499 selects 420 a neighboring location resulting in an optimal state transition of the vehicle from the state at the neighboring location to the state at the location. Such a selection improves the likelihood of selecting more optimal motion even of the neighboring location is not the closest to the location.

Figure 4D:
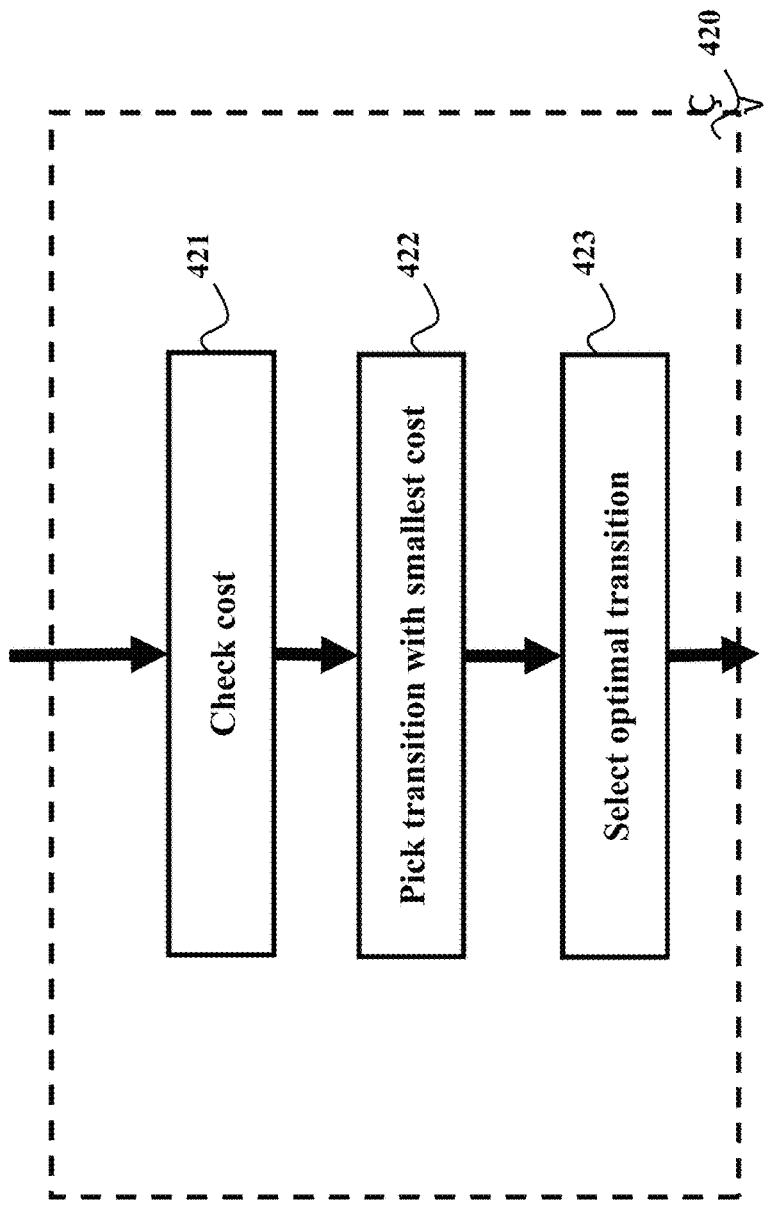
FIG. 4D is a flowchart of a method for selecting the optimal state transition according to one embodiment of the invention.

FIG. 4D shows a flowchart of method 420 for selecting the optimal state transition according to one embodiment of the invention. Method 420 selects the optimal transition from a location to the sampled location 421, wherein the cost function determines which transition is optimal 422, and stores the optimal transition and corresponding state leading up to the sampled location 423. For example, the method determines a cost of each state transition in the set according to a cost function and selects the optimal state transition corresponding to a minimal or a maximal cost. The determination of the minimal or the maximal cost depends on the formulation of the cost function. For example, in one embodiment the cost function minimize deviation of the parameter of the motion. This embodiment selects the state transition corresponding to the minimal cost among costs of each state transition in the set.

The method 499 further updates 430 a graph of state transitions of the vehicle determined during previous iterations with the optimal state transition connecting the selected neighboring location with the location. For example, the method can update the graph with the state transition 281b from the node 280b to the node 260b as the optimal state transition and discard other state transitions leading to the node 260b.

Optionally, the update 430 can further the graph of state transitions of the vehicle with a new state transition from the current location to a previously determined location, if the new state transition reduces a cost of reaching the previously sampled location through the graph.

Figure 4E:
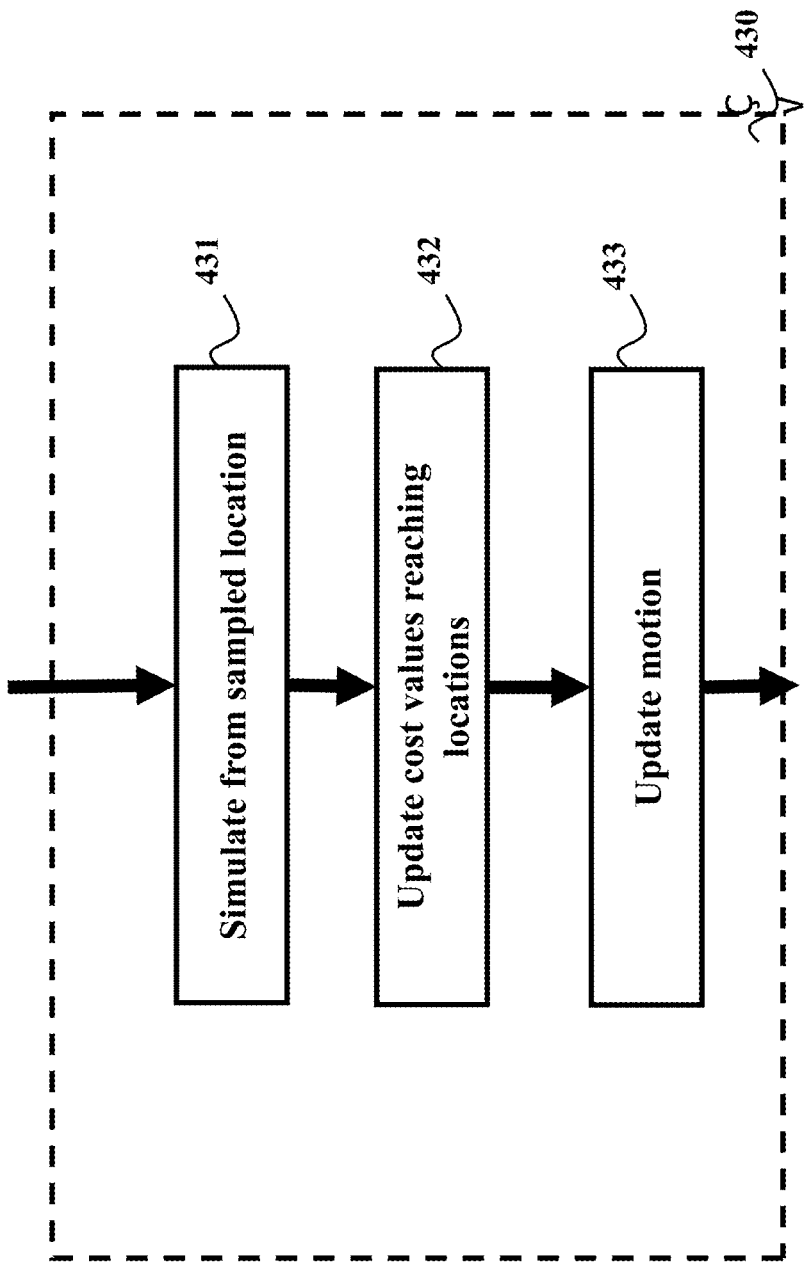
FIG. 4E is a flowchart of a method for updating the motion of the vehicle determined during previous iterations according to one embodiment of the invention.

FIG. 4E shows a flowchart of method 430 for updating the motion of the vehicle determined during previous iterations. For example, a motion leading up to a particular location that was optimal in previous iterations, can be suboptimal when a new location and state are added. First, the sampled location is used as starting location and state trajectories are created toward neighboring locations 431. The cost values of all nodes reached from the location are updated 432, and if the new state trajectories lead to lower cost, the best connections between sampled locations are updated 433. Doing in such a manner, increase the likelihood that the resulting motion is optimal, given the number of output samples that have been created.

After the method 499 iteratively updates the graph of state transitions, the method determines 440 the motion of the vehicle as a sequence of state transitions connecting the initial location with the target location and controls 450 the vehicle according to the determined motion, wherein steps of the method are performed by a processor of the vehicle. For example, the method can determine the sequence of state transitions using a cost function optimizing a parameter of the motion. The cost function can be the same cost function used for selecting the optimal state transition, e.g., the cost function can minimize deviation of the parameter of the motion. Additionally or alternatively, the cost function for determining optimal motion can penalize for different parameters of the movement of the vehicle. In some embodiments, the control 450 includes submitting the motion to the vehicle controller 160.

Generating the Motion

Some embodiments determine the motion from the current state of the vehicle to the target state by considering various constraints on the allowed motion. For example, constraints on drivable areas, to avoid static or dynamic obstacles, are naturally incorporated, but also constraints in terms of properties of the motion can be introduced. Such constraints can be, but are not limited to, that a passenger car should move along the middle of the road under normal driving conditions, or that a minimum distance to obstacles should be maintained.

As an example, it can be difficult to maintain the vehicle exactly in the middle of the road. In one embodiment, points in output space are sampled around the middle of the road, to allow for small deviations. In one embodiment, constraints can be inserted into the cost function instead. For example, a possible constraint is the velocity limits set by the road signs, which are obtained from previous map information or from a camera. When the velocity constraint is inserted as a deviation from the nominal speed limit, the speed limit can be violated when it is necessary for computing a safe motion.

In some embodiments, it is assumed that the vehicle state evolves dynamically in time according to some nonlinear differential equation $\dot{x}=f(x(t),u(t))$, where $f \in R^n$ is a nonlinear equation describing the evolution of the system state and $x \in X \in R^n$, where X is the state space. In some embodiments, the state includes a position vector, a velocity vector, and a heading of the vehicle.

Denote the output space with $Y \in R^m$. The system output $y \in Y$. The system output can be described by the equation $y=h(x(t),u(t))$, where h is a nonlinear mapping from the state and control to the output space. One example is the case $y=(p_x,p_y)$, where the system output is the Cartesian, two-dimensional position vector.

In some embodiments of the invention, the output y is controlled using the control inputs u, which can be steering input, brake torque, or engine throttle. In other embodiments, the control inputs can have the same units as the state. In some embodiments of the invention, the outputs are controlled by tracking a reference trajectory $\sigma_y(t)$, the tracking problem. In other embodiments, the outputs are controlled by point-to-point regulation. Given a desired output value y' and a current output value y of the system, the control law: $(y',y) \mapsto u \in U$ computes a control input in the control space U such that the time evolution of the system state tracks the reference trajectory, or such that the time evolution of the system is sufficiently close to y'.

In one embodiment, the output space of locations is in the space of Cartesian planar locations, but it is to be understood that higher dimensions can be used. Denote with $Y_{free}$ and $Y_{obs}$ the obstacle-free and obstacle region of the output space, respectively, and similarly $X_{free}$ and $X_{obs}$ for the state space. The goal (target) region of the vehicle is denoted with $X_{goal}$ and similarly for the output space. Also, denote with $\mathcal{Y}$ the set of bounded measurable functions mapped from a time interval to Y, and define $\mathcal{X}$, $\mathcal{U}$ similarly. The symbol $\sigma_y \in \mathcal{Y}$ denotes an output (reference) trajectory (path with time information) from one point in the output space to a sampled point $(r_x, r_y)$ in the output space.

The objective with the control law $\phi$ is to move the vehicle from the current state to the goal region $X_{goal}$. The goal region can be a single target state, but it is often sufficient to move close to the target state. The measure of sufficiently close can be chosen in many ways. For example, in one embodiment the measure is chosen as the Euclidean metric. In other embodiments, the measure incorporates the constrained kinematics of a vehicle. For example, when a vehicle travels on a highway, the target state is a point in another lane, it can be sufficient to reach the middle of that lane with high accuracy, but the forward position of the vehicle can differ more. In other examples, it can be of high importance to have a goal region that is small. For example, when the autonomous vehicle is to park in a tight space, the goal region should be tightly chosen.

In other embodiments of the invention, the vehicle should reach the goal region while optimizing some global cost function. Generally, the cost function is expressed as a function of the state of the vehicle at each time, the control inputs to the vehicle at each time, and the reference trajectory of the vehicle at each time, that is, the global cost is $J(x, u, \sigma_y) = j(x(T), u(T), \sigma_y(t)) + \int_0^T g(x(t), u(t), \sigma_y(t)) dt$, where the final time T could either be preset or to be found by the motion planner. The choice of cost function is given by other embodiments of the invention. In one embodiment, the motion-planning problem is defined as moving from initial state to target state (region) while minimizing J, avoiding obstacles, and satisfying constraints of the motion of the vehicle.

One embodiment samples points $(r_x, r_y)$ in the output space of the vehicle. For example, the embodiment samples the position of the vehicle from the drivable space. Also sampling the orientation can help to achieve faster smoothness of the motion, because the orientation change between two consecutive points can be limited.

Sampling strategy can be chosen in any way. In some embodiments, the sampling in output space is done as a combination of independent identically distributed (IID) samples and sampling points close to the target position, measured by some distance function. Such sampling can help in finding an initial motion fast. Other embodiments sample the output space as combinations of IID samples and points located in a neighborhood of the initial paths. Such sampling can help in improving the initial motion that has been computed.

Figure 5A:
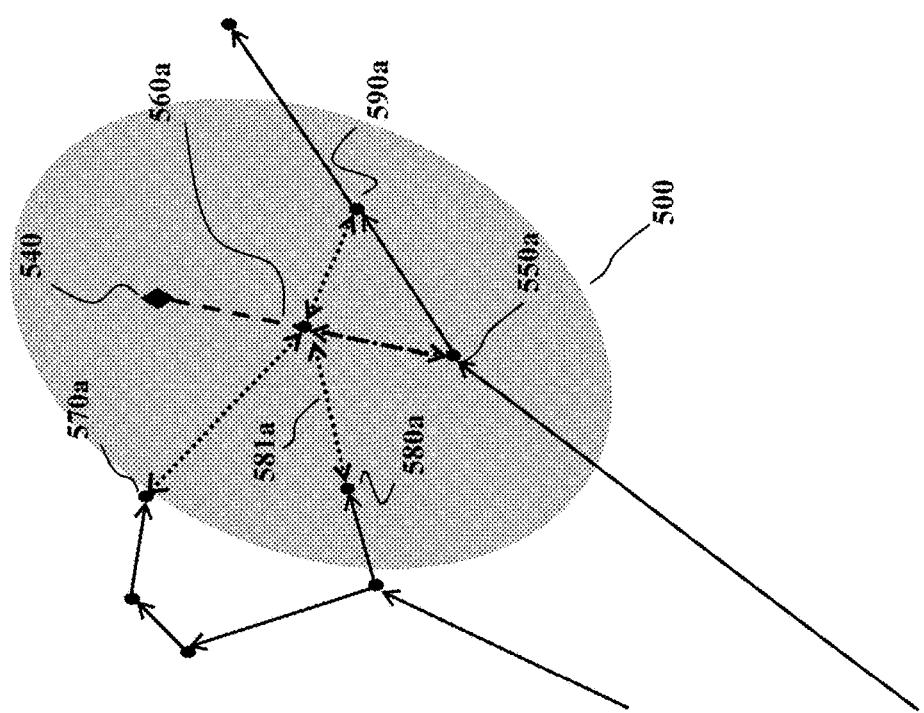
FIG. 5A is a schematic of a connection of nodes in a graph of locations according to one embodiment of the invention.

FIG. 5A shows connection of nodes in graph of locations according to one embodiment. Some embodiments define a function Sample: $\omega \mapsto \{Sample_{i \in N_0}\} \subset Y_{free}$, which returns IID samples from $Y_{free}$. In FIG. 5A, the function Sample returns point 540. Given a graph $G_y = (V_y, E_y)$, where $V_y \in Y_{free}$ is a set of nodes and $E_y$ is a set of edges, each edge connecting two nodes, and a point $y \in Y$, the function Nearest: $(G_y, y) \mapsto v_y \in V_y$ returns the node in $V_y$ that is closest to y in terms of a given distance function. One, but not the only, possibility of distance function is the Euclidean distance function. In FIG. 5A, the function Nearest returns the point 550a.

In some embodiments, given two points $y_{from}, y_{to} \in Y$, the function Steer: $(y_{from}, y_{to}) \mapsto y'$ returns a point $y' \in Y$ such that $y'$ is closer to $y_{to}$ than $y_{from}$ is. One possibility is that the point $y'$ returned by the function Steer will be such that $y'$ minimizes $\|y' - y_{to}\|$ while maintaining $\|y' - y_{from}\| \leq \eta$, for a predefined $\eta \geq 0$, where $\|\cdot\|$ is a general distance function. In one realization of the invention the distance function is the Euclidean norm, but it can also be chosen as nonsymmetric functions or functions tailored to the particular vehicle. In FIG. 5A, the function Steer returns point 560a.

In yet another embodiment, given two points $y_{from}, y_{to} \in G_y$, the Boolean function ObstacleFree($y_{from}, y_{to}$) returns True if the line segment between $y_{from}$ and $y_{to}$ lies in $Y_{free}$ and False otherwise.

Given a graph $G_y = (V_y, E_y)$, where $V_y \in Y_{free}$, a point $y \in Y$, and a positive real number d, the function Near: $(G_y, y, d) \mapsto v_y \in V'_y \subset V_y$ returns the nodes in $V_y$ that are contained in a ball of radius d centered at y. The radius d can, but should not be limited to, be chosen as a function of the number of nodes in the graph: $d(|V_y|) = \gamma \log(|V_y|)/(|V_y|\xi)^{1/2}$, where $\xi$ is the volume of the unit ball in $R^2$, and $|V_y|$ denotes the number of nodes in $V_y$. In the particular example, the two-dimensional output space of planar Cartesian locations is used, but it is to be understood that this can be generalized to higher dimensions. In FIG. 5A, the function Near returns 570a, 580a, and 590a within the ball 500.

Given a state $x \in X_{free}$ and a reference (output) trajectory $\sigma_y$, the function Propagate: $(x, \sigma_y) \mapsto \sigma_x \in X$ returns the state trajectory that is computed by simulating the system dynamics forward in time with the initial state x, the reference trajectory $\sigma_y$, and the control law $\phi$. In some embodiments, the function Propagate returns the state trajectory that is computed by simulating the system dynamics forward in time to reach one particular location. The function propagate can also return the control inputs computed by the control law $\phi$, where the control inputs can be used as feedforward to the true vehicle-control system.

Given a node $v_y \in V_y$, and an output goal region $Y_{goal}$, the function ComputeHeuristic: $(v_y, Y_{goal}) \mapsto c$ returns an estimate of the optimal cost from $v_y$ to $Y_{goal}$, which does not overestimate the true optimal cost; it returns zero if $v_y$ is located inside $Y_{goal}$. For example, ComputeHeuristic can return the straight-line segment between $v_y$ and $Y_{goal}$.

As will be explained by embodiments of the inventions found later, given a graph $G_y = (V_y, E_y)$ in output space, let g* denote the optimal cost-to-come value of the node $v_y \in V_y$, that can be achieved in G. Each node $v_y \in V_y$, is associated with two estimates of the optimal cost-to-come value. The g-value of $v_y$ is the cost of the path to $v_y$ from a given initial state $y_{init} \in Y_{free}$. The one-step lookahead g-value of $v_y$ is denoted with $\bar{g}$ and is the sum of the smallest g-value of the nodes leading up to $v_y$, denoted with $V_{y,pred}$, and the additional cost to move from $v_{y,pred}$ to $v_y$, where the value of the cost is given by the cost functional J when inserting the state trajectory $\sigma_x$ determined from the function Propagate using the control law $\phi$. Similarly to the output graph, some embodiments denote with $G_x = (V_x, E_x)$ a graph in state space, where each node in $V_x$ corresponds to a node in $V_y$, and each edge in $E_x$ corresponds to a state trajectory $\sigma_x$ between two edges in $E_x$, determined from embodiments in the invention described later. Having two different graphs helps in parallelizing computations. For example, if the motion-planning system has access to more than one processor, processors can work simultaneously on updating the respective graph, which helps in decreasing the computational complexity of the motion planning.

Some embodiments determine the output and state graphs of sampled locations and state trajectories as follows. In one embodiment, the output graph is initialized with the location of the vehicle at the current position and no edges, $E_y = \emptyset$. In method 400, a random point 540 in the drivable output space is sampled, the nearest node 550a is found, and a new output location is returned steering the nearest node to the new node, which is in the line between the nearest node and the sampled location. Collisions along the line connecting the new node and the nearest node are checked and, if no collisions are found, the new node 560a with the line as an edge is added to the graph.

Figure 5B:
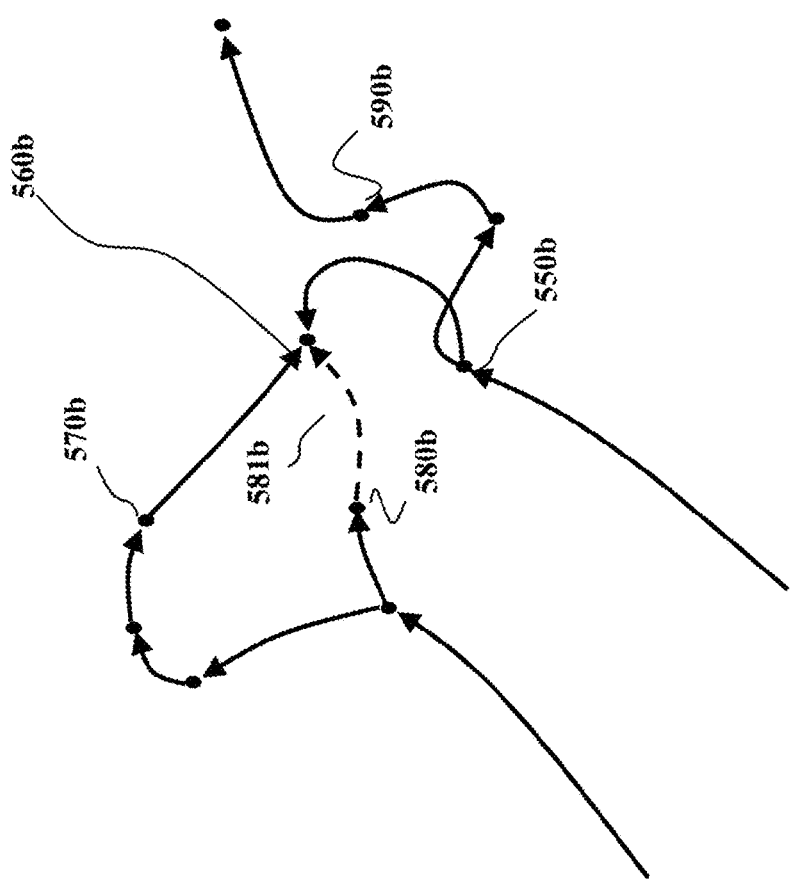
FIG. 5B is a schematic of a connection of nodes in a graph of state transitions according to one embodiment of the invention.

In one embodiment of method 410, the nodes 570a, 580a, and 590a, which are contained in a ball of radius d from node 560a are found, and the set of incoming and outgoing edges between 560a and the nodes in the neighborhood are created. In another embodiment, from all nodes within some distance from the new node 560a, in FIG. 5A 570a, 580a, and 590a, which have been determined in previous iterations, the vehicle is simulated, tracking the reference trajectory $\sigma_y$ from 570a, 580a, and 590a, respectively, to 560a. In other embodiments, the system is regulated toward 560 a. Using a model of the system, $\dot{x}=f(x(t),u(t))$, and the control law $\phi$, state trajectories $\sigma_x$ are obtained for each simulation, where each state trajectory is a collection of states of the vehicle, forward in time. The state trajectories are checked for collision and measured according to their distances to the reference trajectory. If the state trajectories are collision free and are sufficiently close to the reference trajectory, they are added to the state graph, together with the final state, as edges and nodes, respectively. In FIG. 5B, edges 570b, 580b, and 590b, are added as nodes to the state graph with each of the state trajectories having a, possibly different, final state 560b corresponding to point 560a. In one embodiment of the invention, the distance function measuring the distance from state trajectory to reference trajectory is the Euclidean metric. In other embodiments, the distance function is customized to the kinematics of the vehicle.

The method 420 in FIG. 4A selects the optimal transition leading up to node 560a. In one embodiment of the method, the node of 570a, 580a, and 590a that leads to smallest one-step lookahead value $\bar{g}$ from the respective node 570b, 580b, and 590b, to 560b is chosen as a parent node of 560b, and the corresponding $\bar{g}$ value of 560a is updated. For example, in FIG. 5B, the state trajectory 581b incurs lowest $\bar{g}$-value of all neighboring nodes, using the reference trajectory 581a, and 580a is therefore set as a parent node to 560a in FIG. 5A.

Figure 6A:
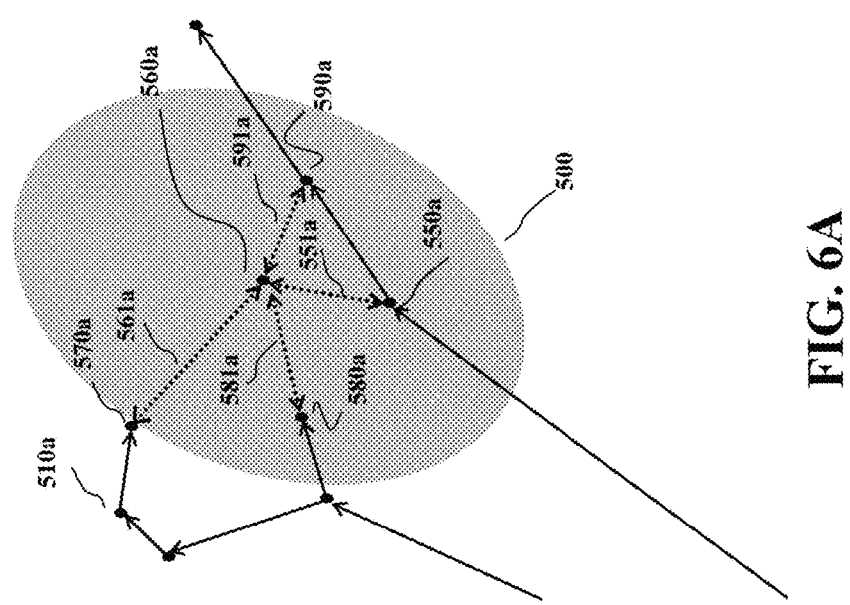
FIG. 6A is a schematic of transitions in the graph of locations according to one embodiment of the invention.
Figure 6B:
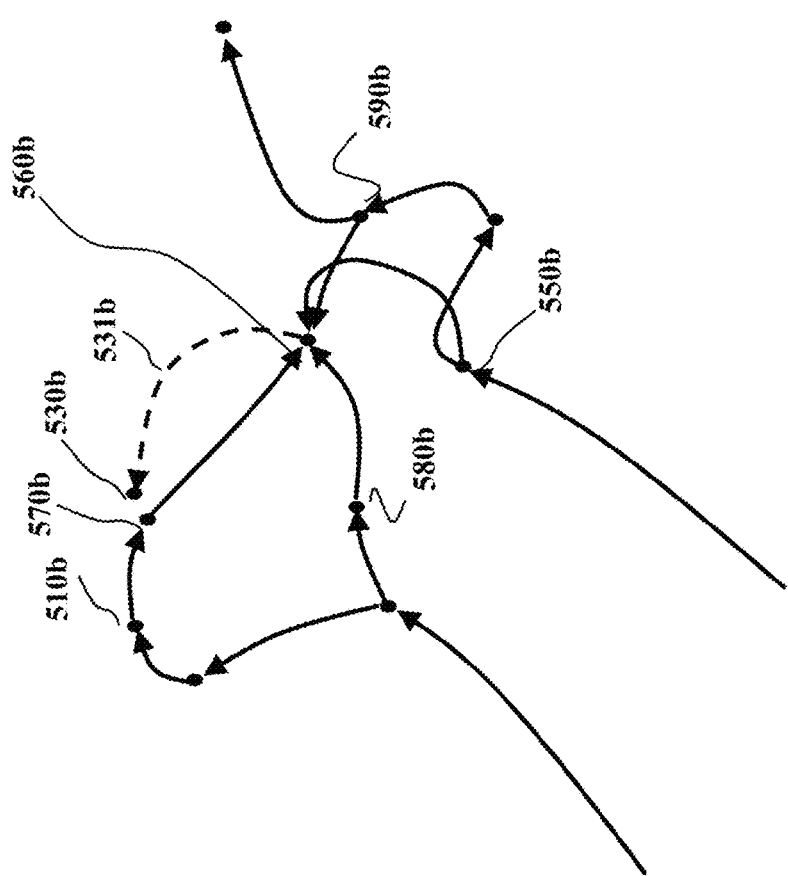
FIG. 6B is a schematic of transitions in the graph of state transitions according to one embodiment of the invention.

In yet some other embodiments, method 430 in FIG. 4A updates the motion on the state graph and the corresponding edges on the output graph. FIG. 6A shows all outgoing edges from 560a; 561a, 581a, 551a, 591a, determined in method 410, which are used as reference trajectories to the control law. For each output reference trajectory from output location 560a, if the state trajectory is collision free, a new state node and corresponding state trajectory (edge) is created. For example, FIG. 6B shows a case where moving the vehicle with reference (output) nodes from 560a to 570a leads to a state trajectory 531b and state node 530b corresponding to 570a, which incurs a lower cost from the root node to 570a, than taking the route through 510b. Therefore, 560a and 560b are made the new parent output node and parent state node, respectively, to 570a and 530b. In some embodiments, the function ComputeHeuristic is used to choose which nodes on the output graph to update.

The method 440 selects the optimal motion reaching the target state. One embodiment of the invention selects the motion reaching the target state from the initial state incurring lowest cost.

Some embodiments of method 450 controls the vehicle according to the motion computed by the motion-planning system 140. The motion computed by the motion-planning system is used as a reference trajectory to the control system of the vehicle. In one embodiment, a model of the vehicle-control system is used to determine the optimal motion of the vehicle moving from current state of the vehicle to target state of the vehicle. In another embodiment, the model of the vehicle-control system used in the motion-planning system is an approximation of the true vehicle-control system. For example, one embodiment of the invention uses reference trajectories in the form of Cartesian planar locations and determines state trajectories for the vehicle. In one embodiment, the state contains position, velocity vector, and heading of the vehicle. In some embodiments, the true vehicle-control system can use trajectories of the velocity vector and heading, in addition to the position vector, as reference trajectories to the true vehicle-control system.

For example, the true vehicle-control system can be composed of one or several model-predictive controllers (MPCs), which predicts future behavior of the vehicle to choose control inputs to move along the state trajectory computed by the motion-planning system.

Figure 7:
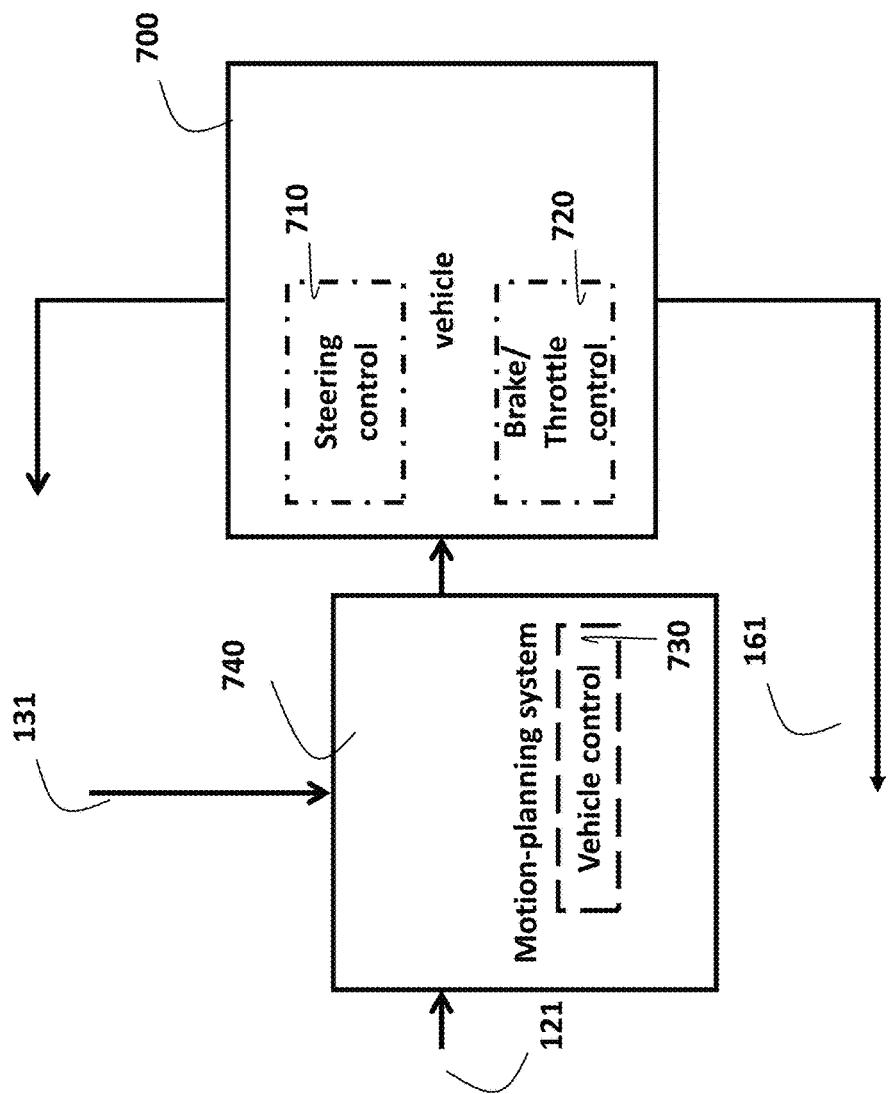
FIG. 7 is a schematic of interaction between the motion planning system and a vehicles controller according to some embodiments of the invention.

FIG. 7 shows a schematic of interaction between the motion planning system and the vehicles controllers according to some embodiments of the invention. For example, in some embodiments of the invention, the controllers of the vehicle 700 are steering 710 and brake/throttle controllers 720 that control rotation and acceleration of the vehicle 700. However, in one embodiment the motion-planning system 740 uses a simpler controller 730, such as a proportional controller, which behaves similarly to the MPC but not exactly. In one embodiment, the control inputs computed in the motion planner to move the vehicle, are used as feed-forward control inputs to the true vehicle-control system. Doing in such a manner, the true vehicle-control system only controls deviation due to modeling errors in the motion planner.

In some embodiments of the invention, the distance from the current location to the location of the target state is larger than the distance between sampled locations. In such a case, the model of the vehicle-control system in the motion planner can be the same as in the true vehicle-control system, such as an MPC, but where the prediction in the MPC is made over a longer horizon in the true vehicle-control system.

Cost Function

The motion planner computes a motion subject to minimizing a cost function $J(x,u,\sigma_y)=j(x(T),u(T),\sigma_y(t))+\int_0^T g(x(t),u(t),\sigma_y(t))\,dt$ and satisfying constraints on the movement of the vehicle and avoiding collision with obstacles. One embodiment chooses the cost function as $J=\int_0^T k_1\|p-p_{ref}\|+k_1\|v-v_{ref}\|dt$, where $k_1$ and $k_1$ are positive weights on the Euclidean distances, $p_{ref}$ and $v_{ref}$ are desired path and velocity, respectively, coining from a navigation system, computed, for example, from driver or passenger inputs, or estimated from cameras, and p and v are position and velocity of the vehicle. In other embodiments, the cost function is chosen as $J=T$, where T is the time of the motion to reach the target region from initial state. Yet another embodiment uses $J=k_1\Delta\delta+k_2\Delta v$, where $\Delta\delta$ and $\Delta v$ are the number of changes from positive to negative steering angle and velocity, respectively, and vice versa.

Controlling the Vehicle Recursively

Figure 8:
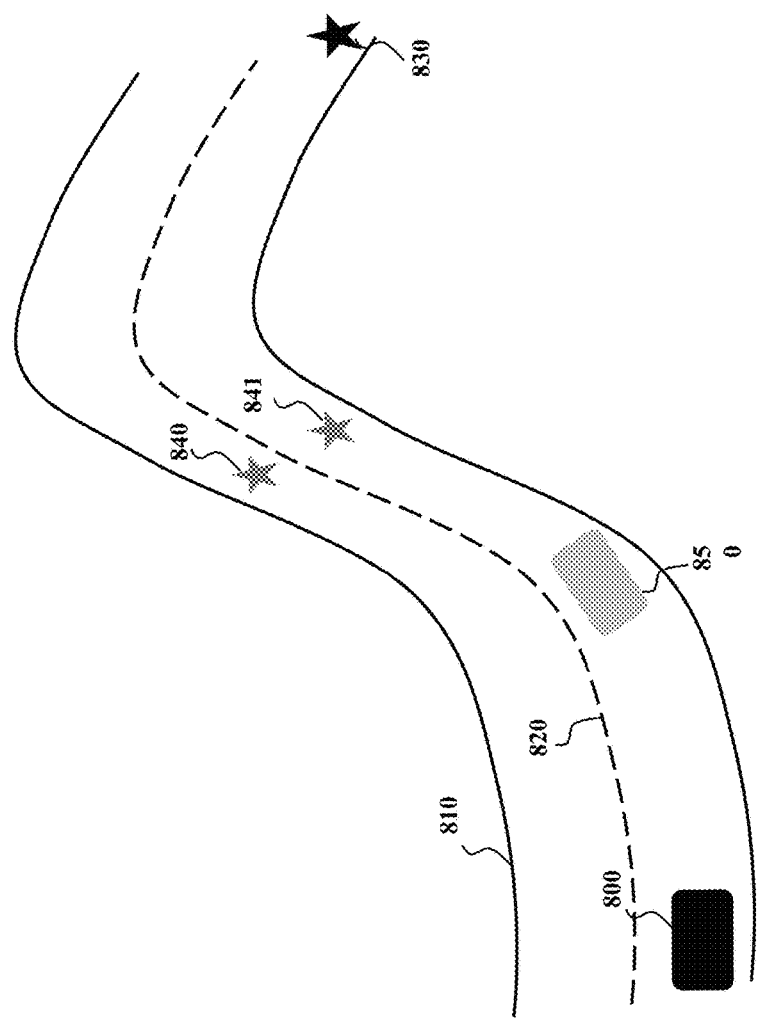
FIG. 8 is a schematic of an insertion of intermediate target position according to one embodiment of the invention.

One embodiment inserts intermediate target outputs between the current location and the target state. For example, FIG. 8 shows a situation where the autonomous vehicle 800 moves on a two-lane road with road edges 810 and divider 820 between the two lanes, has received a target location 830, but the motion-planning system cannot compute a safe motion to the target 830 within the allocated time slot. In one embodiment of the invention, the motion planner inserts intermediate target points 840 and/or 841, which are easier to reach. In one embodiment, one target point in each lane is inserted. For example, when there is an obstacle 850 on the road, depending on the cost function used, the motion planner can determine whether or not overtaking of the vehicle 850 is initiated. In another embodiment, the navigation system can provide such intermediate targets.

For example, one embodiment determines an intermediate target location, e.g., the location 840 between the initial location and the target location, determines a first motion between the initial location and the intermediate target location, and controls the vehicle to reach the intermediate target location using the first motion. Next, the embodiment determines a second motion between the intermediate target location and the target location and controls the vehicle to reach the target location using the second motion.

In some embodiments, when the time slot for computation has expired, the computed motion to the intermediate target is sent to the vehicle-control system as a reference, while the motion-planning system continues to compute an improved motion to the target state 830. In some embodiments, the intermediate targets are updated as new predicted motions are sent to the vehicle-control system. In other embodiments, the parts of the graphs that are not executed are removed before improving the motion, to increase efficiency.

Some embodiments determine the target location as the furthest location the motion-planning system can process. For example, one embodiment determines a period of time allowed for determining the motion, determines a maximal distance allowing to compute the motion within the period of time, and determines a location at the maximal distance from the initial location toward a final destination as the target location.

Figure 9:
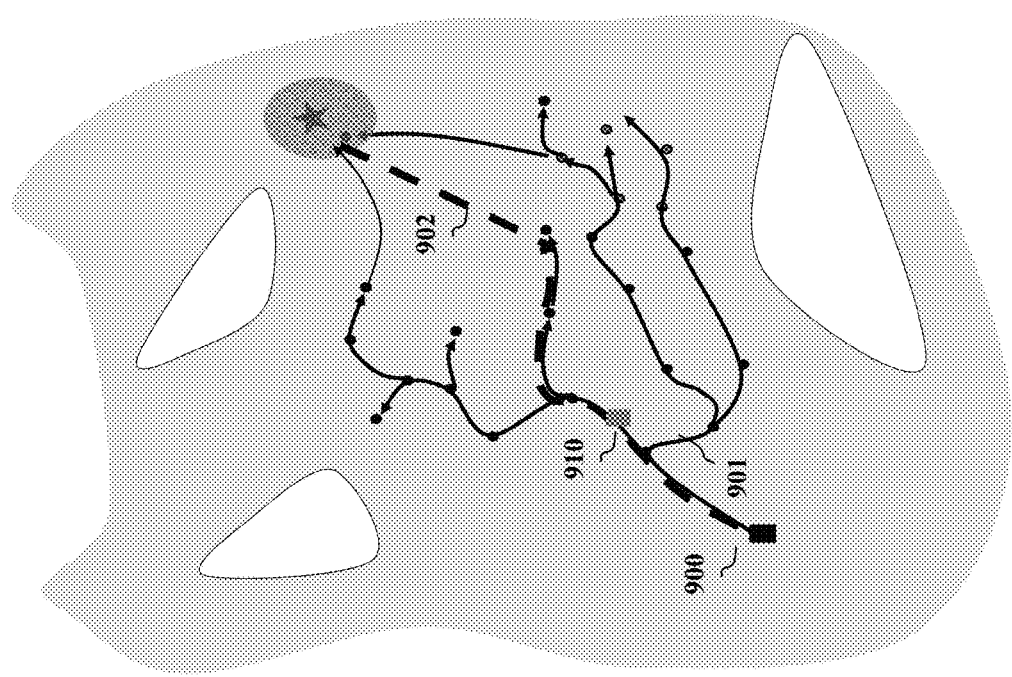
FIG. 9 is a schematic of the motion submitted to the vehicle controller for moving the vehicle according to one embodiment of the invention.

FIG. 9 shows a schematic of the motion 902 submitted to the vehicle controller for moving the vehicle 900. At the next planning cycle, the vehicle has moved to 910. In one embodiment of the invention, the motion planner predicts this and removes the nodes and edges in the graphs corresponding to redundant parts 901.

When a previously computed optimal motion is available, the motion-planning system can use that motion to reduce the number of computations. However, the path can need to be adjusted for accounting for changes in the nondrivable area, due for instance to one or more obstacles that moved, and for the changed vehicle position.

In some embodiments, when a new obstacle appears or an obstacle changes position relative to what was predicted in the motion planner, first the edges in the state graph that collide with the new predicted obstacle motion are determined. For each edge that intersects with obstacles, the corresponding child endpoint node is marked as invalid. Next, the tree is trimmed and regrown.

Some embodiments are based on the realization that computing an optimal motion can be computationally complex. Therefore, the embodiment first computes an initial obstacle-free motion from current state of the vehicle to target state, or region, of the vehicle. If time permits, after computing an obstacle-free motion, one embodiment computes improved motions by expanding the number of possible motions around the first, obstacle-free motion, in combination with random sampling. In such a manner, computational complexity is reduced while enabling computation of the motion.

Some embodiments of the invention acknowledge that the predicted motion can have to be updated. For example, the predicted motion needs to be updated because a sensor has detected an obstacle on the predicted path or the predicted behavior of some obstacle has changed, and/or the estimate of the vehicle state has changed, leading to deviations from the computed motion.

Figure 10:
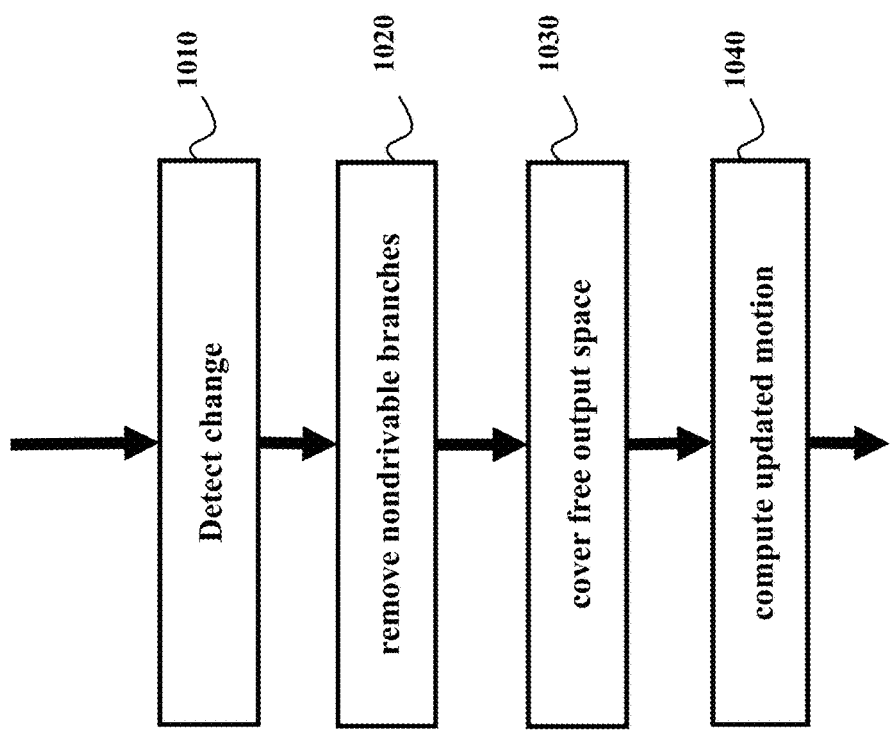
FIG. 10 is a flowchart of a method for updating the motion according to one embodiment of the invention.

FIG. 10 shows a flowchart of a method for updating the motion according to one embodiment of the invention. First, the sensing system detects changes 1010 in the environment or changes in the estimate of the vehicle state. Branches corresponding to nodes leading to unsafe motions are removed 1020. Potential areas that were uncovered previously are sampled, together with additional sampling and connections of locations as time permits 1030, and the motion is updated 1040.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling a vehicle, comprising:
   determining iteratively a motion of the vehicle from an initial location and a target location, wherein the motion is defined by state transitions connecting states of the vehicle, each state includes a location, a velocity and a heading of the vehicle, wherein the motion is determined iteratively until a termination condition is met, wherein an iteration comprises:
   determining a location between the initial location and the target location, wherein the location satisfies spatial constraints on locations of the vehicle;
   determining state transitions of the vehicle moved to the location from a set of neighboring locations determined during previous iterations, wherein each state transition satisfies constraints on a motion of the vehicle;

selecting a neighboring location resulting in an optimal state transition of the vehicle from the state at the neighboring location to the state at the location; and
updating a graph of state transitions of the vehicle determined during previous iterations with the optimal state transition;
determining the motion of the vehicle as a sequence of state transitions connecting the initial location with the target location; and
controlling the vehicle according to the determined motion, wherein steps of the method are performed by a processor of the vehicle.

2. The method of claim 1, wherein the determining the current location comprises:
sampling a space of locations between the initial location and the target location to produce a sampled location;
connecting the sampled location with a previously sampled location that is closest to the current location; and
selecting the sampled location as the current location if a line segment connecting the sampled location with the previously sampled location is free from a collision.

3. The method of claim 2, further comprising:
determining a length of the line segment; and
replacing the sampled location with an intermediate location on the line segment at a predetermined distance along the line segment from the previously sampled location, if the length is greater than the predetermined distance.

4. The method of claim 1, wherein the determining state transitions comprises:
selecting the set of neighboring locations within a distance from the current location;
determining a state transition of the vehicle from the state of each neighboring location in the set to the current location to produce a set of state transitions, wherein each state transition is determined by emulating responses of a vehicle controller moving the vehicle using a model of the vehicle controller.

5. The method of claim 4, wherein the constraints on the motion of the vehicle define that the state transitions are free from the collision, comprising:
testing whether the state transition is free from the collision; and
removing the state transition from the set of the state transition, if the state transition results in a collision.

6. The method of claim 5, further comprising:
determining a position of an obstacle between the initial location and the target location as a function of time;
determining the state transition as a function of time; and
testing whether the position of the obstacle and the state transition intersects in both the time and the space.

7. The method of claim 4, further comprising:
determining the distance as a function of a total number of previously sampled locations.

8. The method of claim 1, wherein the selecting comprises:
determining a cost of each state transition in the set according to a cost function; and
selecting the optimal state transition corresponding to a minimal or a maximal cost.

9. The method of claim 1, further comprising:
updating the graph of state transitions of the vehicle with a new state transition from the current location to a previously determined location, if the new state transition reduces a cost of reaching the previously sampled location through the graph.

10. The method of claim 1, further comprising:
determining the sequence of state transitions using a cost function optimizing a parameter of the motion.

11. The method of claim 10, wherein the cost function minimizes deviation of the parameter of the motion.

12. The method of claim 1, further comprising:
determining an intermediate target location between the initial location and the target location;
determining a first motion between the initial location and the intermediate target location;
controlling the vehicle to reach the intermediate target location using the first motion;
determining a second motion between the intermediate target location and the target location;
controlling the vehicle to reach the target location using the second motion.

13. The method of claim 1, further comprising:
determining a period of time allowed for determining the motion;
determining a maximal distance allowing to compute the motion within the period of time; and
determining a location at the maximal distance from the initial location toward a final destination as the target location.

14. A control system of a vehicle, comprising:
a navigation system to determine an initial location and a target location of the vehicle;
a vehicle controller to control a motion of the vehicle; and
a motion-planning system including a processor and a memory storing the initial location and the target location, wherein the motion-planning system iteratively determines state transitions moving the vehicle to a location from a plurality of neighboring locations having states determined during previous iterations to produce a graph of state transitions of the vehicle, wherein the motion-planning system determines the motion of the vehicle as a sequence of state transitions connecting the initial location with the target location, and submits the motion to the vehicle controller.

15. The control system of claim 14, wherein the motion-planning system determines that each state transition is free from a collision.

16. The control system of claim 15, wherein the motion-planning system is configured to
determine a position of an obstacle between the initial location and the target location as a function of time;
determine the state transition as a function of time; and
test whether the position of the obstacle and the state transition intersects in both the time and the space.

17. The control system of claim 15, wherein the motion-planning system is configured to determine iteratively a motion of the vehicle from the initial location and the target location, wherein the motion is defined by state transitions connecting states of the vehicle, each state includes a location, a velocity and a heading of the vehicle, wherein the motion is determined iteratively until a termination condition is met, wherein an iteration comprises:
determining a location between the initial location and the target location, wherein the location satisfies spatial constraints on locations of the vehicle;
determining state transitions of the vehicle moved to the location from a set of neighboring locations determined during previous iterations, wherein each state transition satisfies constraints on a movement of the vehicle;
selecting a neighboring location resulting in an optimal state transition of the vehicle from the state at the neighboring location to the state at the location; and updating the graph of state transitions of the vehicle determined during previous iterations with the optimal state transition connecting the selected neighboring location with the location.

18. The control system of claim 14, wherein the motion-planning system determines that each state transition by emulating responses of the vehicle controller with a model of the vehicle controller.

19. The control system of claim 14, wherein the motion-planning system determines the sequence of state transitions using a cost function optimizing a parameter of the motion.

20. The control system of claim 14, wherein the motion-planning system updates the graph of state transitions of the vehicle with a new state transition from the current location to a previously determined location, if the new state transition reduces a cost of reaching the previously sampled location through the graph.

* * * * *